(12) United States Patent
Liu et al.

(10) Patent No.: US 11,292,038 B2
(45) Date of Patent: Apr. 5, 2022

(54) COMBINED TREATMENT METHOD OF PETROLEUM-CONTAMINATED SOIL

(71) Applicant: China University of Petroleum, Qingdao (CN)

(72) Inventors: Dong Liu, Qingdao (CN); Shuhai Guo, Qingdao (CN); Wei Zhu, Qingdao (CN); Fushan Wen, Qingdao (CN); Nan Shi, Qingdao (CN); Yu Qiu, Qingdao (CN); Xiaoning Feng, Qingdao (CN); Bo Wu, Qingdao (CN); Gang Li, Qingdao (CN); Changlong Yin, Qingdao (CN); Xiujie Yang, Qingdao (CN); Dehui Kong, Qingdao (CN); Hongbo Dai, Qingdao (CN); Mengfei Li, Qingdao (CN); Sa Wang, Qingdao (CN)

(73) Assignee: CHINA UNIVERSITY OF PETROLEUM, Qingdao (CN)

( * ) Notice: Subject to any disclaimer, the term of this patent is extended or adjusted under 35 U.S.C. 154(b) by 0 days.

(21) Appl. No.: 17/292,729

(22) PCT Filed: Oct. 19, 2020

(86) PCT No.: PCT/CN2020/121741
§ 371 (c)(1),
(2) Date: May 11, 2021

(87) PCT Pub. No.: WO2021/227361
PCT Pub. Date: Nov. 18, 2021

(65) Prior Publication Data
US 2021/0370365 A1 Dec. 2, 2021

(30) Foreign Application Priority Data
May 9, 2020 (CN) .......................... 202010384208.3

(51) Int. Cl.
```
B09C 1/00      (2006.01)
B01J 23/745    (2006.01)
B01J 35/00     (2006.01)
B01J 37/04     (2006.01)
B01J 37/06     (2006.01)
B01J 37/08     (2006.01)
B09C 1/06      (2006.01)
B09C 1/08      (2006.01)
C01G 49/00     (2006.01)
```
(52) U.S. Cl.
CPC ............... *B09C 1/00* (2013.01); *B01J 23/745* (2013.01); *B01J 35/004* (2013.01); *B01J 37/04* (2013.01); *B01J 37/06* (2013.01); *B01J 37/088* (2013.01); *B09C 1/065* (2013.01); *B09C 1/08* (2013.01); *C01G 49/0018* (2013.01)

(58) Field of Classification Search
None
See application file for complete search history.

(56) References Cited

U.S. PATENT DOCUMENTS

| | | | |
|---|---|---|---|
| 2003/0089594 A1* | 5/2003 | Kato | A62D 3/176 204/157.3 |
| 2005/0109710 A1 | 5/2005 | Mitarai et al. | |
| 2007/0119277 A1* | 5/2007 | Russell | C22B 3/22 75/712 |
| 2014/0219724 A1* | 8/2014 | Rippetoe | B09C 1/06 405/128.8 |

FOREIGN PATENT DOCUMENTS

| | | |
|---|---|---|
| CN | 1692977 A | 11/2005 |
| CN | 202372396 U | 8/2012 |
| CN | 104492801 A | 4/2015 |
| CN | 205518970 U | 8/2016 |
| CN | 107312204 A | 11/2017 |
| CN | 108686658 A | 10/2018 |
| CN | 109226240 A | 1/2019 |
| CN | 109382404 A | 2/2019 |
| CN | 109821889 A | 5/2019 |

(Continued)

OTHER PUBLICATIONS

Tianxiang Xia, et al., PAHs thermal desorption behavior of coking plant soil and its effect on soil characteristics, CIESC Journal, 2014, pp. 1470-1480, vol. 65 No. 4.

(Continued)

*Primary Examiner* — Sheng H Davis
(74) *Attorney, Agent, or Firm* — Bayramoglu Law Offices LLC

(57) ABSTRACT

A combined remediation method of petroleum-contaminated soil includes: impurity removal pretreatment, photocatalytic pre-oxidation, stepwise thermal desorption of petroleum from soil, and high-temperature oxidation; with iron-titanium composite metal oxide (ITCMO) as a catalyst, conducting oxidation pretreatment under light conditions so that some cross-linked structures in macromolecular petroleum contaminants are broken and degraded; and conducting stepwise pyrolysis to achieve a removal rate of more than 98.00%. The new method adopts a combined remediation technology of photocatalytic pre-oxidation-stepwise pyrolysis, which realizes a relatively-high removal rate of petroleum hydrocarbons and the efficient and harmless remediation of high-concentration petroleum-contaminated soil, and remedied soil can be reused.

19 Claims, 1 Drawing Sheet

(56) References Cited

FOREIGN PATENT DOCUMENTS

| CN | 109967516 A | 7/2019 |
|----|-------------|--------|
| CN | 209334434 U | 9/2019 |
| CN | 110697869 A | 1/2020 |
| CN | 111530908 A | 8/2020 |
| JP | 2005152859 A | 6/2005 |
| WO | 03061862 A1 | 7/2003 |

OTHER PUBLICATIONS

Luliang Qi, et al., Practical Handbook of Water Treatment Technology and Operation Management, 2002, pp. 944, China Petrochemical Press.

* cited by examiner

COMBINED TREATMENT METHOD OF PETROLEUM-CONTAMINATED SOIL

CROSS REFERENCE TO THE RELATED APPLICATIONS

This application is the national phase entry of International Application No. PCT/CN2020/121741, filed on Oct. 19, 2020, which is based upon and claims priority to Chinese Patent Application No. 202010384208.3, filed on May 9, 2020, the entire contents of which are incorporated herein by reference.

TECHNICAL FIELD

The present disclosure belongs to the field of petrochemical environmental protection, and relates to a combined treatment method of petroleum-contaminated soil by photocatalysis and thermal oxidation.

BACKGROUND

With the rapid development of petroleum industry, petroleum contamination, especially petroleum contamination in soil, has become a global problem. Due to the increasing amount of extracted petroleum, petroleum contamination in soil is becoming more and more serious, posing a critical threat to the ecological environment and personal safety. Petroleum contamination has the characteristics of a complex system, wide range, difficult treatment, long cycle, great hazard, and so on. The petroleum contamination in soil is one of the main contaminations from oil fields and refining and chemical enterprises, and is also an important part to be controlled in oil field and refining and chemical production. The comprehensive utilization of petroleum-contaminated soil has now been listed as an important task for China to develop a circular economy and build a conservation-oriented society. The comprehensive utilization of petroleum-contaminated soil will become a fundamental way for the disposal of petroleum-contaminated soil in the future.

The remediation of petroleum-contaminated soil includes a chemical method, a biological method, a physical method, combined remediation of multiple methods, etc. A pyrolysis method has attracted wide attention due to its advantages such as thorough treatment and less secondary contamination.

Chinese patent CN201410745575.6 relates to a remediation method of petroleum-contaminated soil, where, petroleum-contaminated soil to be remedied is subjected to ex-situ remediation. Specifically, water is added at room temperature and a resulting mixture is heated and stirred. Then, octylphenol polyoxyethylene ether, lauryl dimethylamine oxide (LDAO), and aluminium phosphate are added, and a resulting mixture is further stirred. Betaine and calcium boride are added, and a resulting mixture is further stirred. The petroleum-contaminated soil in the mixing tank is subjected to microwave radiation, and petroleum and water in the upper layer are removed. The remedied soil and water in the lower layer are separated.

Chinese patent CN201910305416.7 relates to a method for enhancing the pyrolysis remediation of petroleum-contaminated soil. The method adopts $Fe_2O_3$ to enhance the pyrolysis remediation of petroleum-contaminated soil, which can reduce an energy barrier of pyrolysis so that the pyrolysis starts at a relatively-low temperature and proceeds at an accelerated rate, improves the removal efficiency of petroleum contaminants, shortens the pyrolysis time, and protects the ecological functions of soil. The method has the advantages of environmental friendliness, low energy consumption, high contaminant removal efficiency, and attainable resource recycling.

However, in most petroleum-contaminated soils, petroleum is closely and stably adsorbed to soil, so it is difficult to separate petroleum from soil. Studies have shown that some cross-linked structures in petroleum contaminants cannot exist stably under light conditions, which makes it feasible to initially degrade petroleum contaminants through photocatalysis. In view of this, the use of a combined technology of multiple remediations can achieve a high removal rate of petroleum hydrocarbons and ultimately achieve a prominent remediation effect.

SUMMARY

The present disclosure is mainly intended to solve the problems in existing remediation technologies and provide a combined remediation method of petroleum-contaminated soil. The method has a high removal rate of petroleum hydrocarbons and can realize efficient and harmless remediation of high-concentration petroleum-contaminated soil, and remedied soil can be reused.

In order to achieve the above objective, the present disclosure provides a combined remediation method of petroleum-contaminated soil, including the following specific steps:

(1) impurity removal pretreatment: crushing large pieces of the petroleum-contaminated soil in a crusher until an obtained material has a size of less than 40 mesh, and sieving the material through a 40-mesh sample sieve to remove impurities from the petroleum-contaminated soil to obtain a petroleum-contaminated soil sample.

(2) photocatalytic pre-oxidation: taking a given amount of the petroleum-contaminated soil sample, adding a catalyst (0.5% the mass of the petroleum-contaminated soil sample) and hydrogen peroxide with a mass concentration of 30% (0.1% the mass of the petroleum-contaminated soil sample), and thoroughly mixing a resulting mixture; and spreading the mixture under sunlight and insolating for 6 h to 15 h, during which period, the mixture is turned over from time to time;

(3) stepwise pyrolysis: transferring a material obtained in step (2) to an equipment chamber for stepwise pyrolysis, where, the pyrolysis process includes 3 stages: a first stage: temperature: 300° C. to 350° C., and heating time: 30 min to 60 min; a second stage: temperature: 400° C. to 450° C., and heating time: 60 min to 120 min; and a third stage: temperature: 500° C. to 550° C., and heating time: 60 min to 120 min; and (4) cooling a material obtained from the stepwise pyrolysis to obtain remedied soil.

Further, the catalyst may be $Fe_xTiO_y$, where, the x has a range of 0.008 to 0.76 and the y has a range of 2.012 to 3.14; and the catalyst $Fe_xTiO_y$ may be prepared by the following method:

adding a 30 wt % iron precursor solution dropwise to 250 mL of deionized water under stirring, and further stirring a resulting mixture for 10 min; adding a solution of 85 wt % titanium precursor in isopropanol dropwise, and further stirring a resulting mixture for 30 min; adding ammonia water dropwise, adjusting a pH to 8.6 to 9.0, and stirring a resulting mixture for 2 h; statically aging the mixture for 12 h at 60° C., filtering, and washing with deionized water to neutrality; and roasting a resulting product at 350° C. for 6 h to obtain the catalyst $Fe_xTiO_y$, where, the Fe and Ti in the preparation slurry may have a molar ratio of 0.01 to 0.5.

The iron precursor solution may be a soluble iron salt aqueous solution and the soluble iron salt may be one or more of ferric chloride, ferric nitrate, and iron acetate.

The solution of titanium precursor in isopropanol may be a solution of soluble titanate in isopropanol, and the soluble titanate may be titanium tetraisopropoxide (TTIP) or tetrabutyl titanate (TBT).

The method of the present disclosure includes the following steps: subjecting petroleum-contaminated soil to the combined treatment of impurity removal pretreatment, photocatalytic pre-oxidation, stepwise thermal desorption, and high-temperature oxidation; with an iron-titanium composite metal oxide (ITCMO) as a catalyst, subjecting the high-concentration petroleum-contaminated soil to oxidation pretreatment under light conditions so that some cross-linked structures in macromolecular petroleum contaminants are broken and degraded; and conducting stepwise pyrolysis at 300° C. to 350° C., 400° C. to 450° C., and 500° C. to 550° C., which greatly improves a removal rate of petroleum hydrocarbons. The remedied soil is subjected to extraction with dichloromethane (DCM), then the solvent is evaporated by suction filtration, and a calculated petroleum content in the remedied soil is less than 0.20%, indicating a removal rate of more than 98.00%.

Compared with the prior art, the present disclosure has the following significant progress: a combined remediation technology of photocatalytic pre-oxidation-stepwise pyrolysis is adopted, which realizes a relatively-high removal rate of petroleum hydrocarbons and the efficient and harmless remediation of high-concentration petroleum-contaminated soil; and remedied soil can be reused.

DETAILED DESCRIPTION OF THE EMBODIMENTS

Figure 1A:
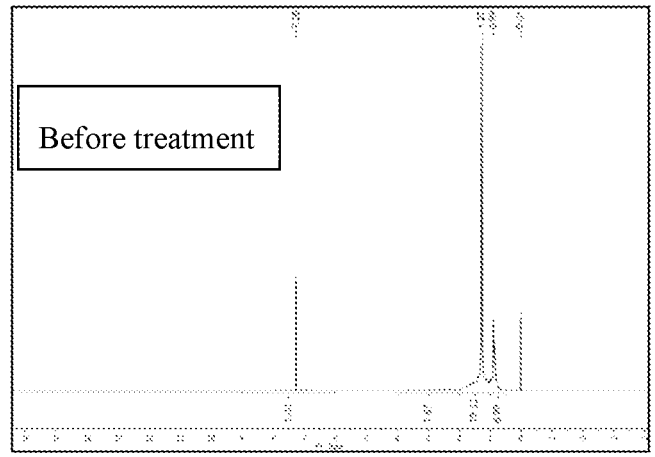
FIG. 1A shows an $^1$H-nuclear magnetic resonance ($^1$H-NMR) spectrum of crude oil-contaminated soil before treatment.

The technical solutions of the present disclosure are described in further detail below with reference to examples.

Example 1: Preparation of Catalysts

In this example, the catalyst $Fe_xTiO_y$ (where, the x had a range of 0.008 to 0.76, and the y had a range of 2.012 to 3.14) was prepared by the following method:

A 30 wt % iron precursor solution was added dropwise to 250 mL of deionized water under stirring, and a resulting mixture was further stirred for 10 min; a solution of 85 wt % titanium precursor in isopropanol was added dropwise, and a resulting mixture was further stirred for 30 min; ammonia water was added dropwise, a pH was adjusted to 8.6 to 9.0, and a resulting mixture was stirred for 2 h; the mixture was statically aged for 12 h at 60° C., then filtered, and washed with deionized water to neutrality; and a resulting product was roasted at 350° C. for 6 h to obtain the catalyst $Fe_xTiO_y$. The iron precursor solution was a soluble iron salt aqueous solution and the solution of titanium precursor in isopropanol was a solution of soluble titanate in isopropanol.

The soluble iron salt, the soluble titanate, and a molar ratio of Fe/Ti in the preparation slurry were shown in the table below, and catalysts C-1, C-2, and C-3 were obtained correspondingly.

TABLE 1

Preparation of catalysts

| No. | Soluble iron salt | Soluble titanate | Molar ratio of Fe/Ti |
|---|---|---|---|
| Catalyst C-1 | Ferric chloride | TTIP | 0.25 |
| Catalyst C-2 | Ferric nitrate | TTIP | 0.02 |
| Catalyst C-3 | Iron acetate | TBT | 0.45 |

Example 2

A ground petroleum-contaminated soil sample came from the Shengli Oil Field. The petroleum-contaminated soil had poor mobility, a dark-brown color, a higher density than water, and a smell of petroleum. As determined, the petroleum-contaminated soil had a water content of 1.50% and a petroleum content of 10.00%.

Remediation was specifically conducted by the following steps:

(1) Impurity removal pretreatment: large pieces of the petroleum-contaminated soil were crushed in a crusher and then sieved through a 40-mesh sample sieve to remove impurities from the petroleum-contaminated soil to obtain a petroleum-contaminated soil sample.

(2) Photocatalytic pre-oxidation: 10.00 g of the petroleum-contaminated soil sample was weighed and then thoroughly mixed with 0.05 g of catalyst C-1 and 0.01 g of hydrogen peroxide with a mass concentration of 30%, and a resulting mixture was spread under sunlight and insolated for 12 h, during which period, the mixture was turned over from time to time.

(3) Stepwise pyrolysis: a sample obtained from the photocatalytic pre-oxidation was added to a test tube and then placed in a reactor, and a pyrolysis process was conducted based on stepwise temperature rise, where, the pyrolysis process included 3 stages: a first stage: temperature: 300° C. to 350° C., and heating time: 30 min to 60 min; a second stage: temperature: 400° C. to 450° C., and heating time: 60 min to 120 min; and a third stage: temperature: 500° C. to 550° C., and heating time: 60 min to 120 min.

(4) A material obtained from the stepwise pyrolysis was cooled to obtain remedied soil.

The pyrolyzed soil was subjected to extraction with DCM, then the solvent was evaporated by suction filtration, and a calculated petroleum content in the remedied soil was 0.20%, with an actual removal rate of 98.00%.

Figure 1B:
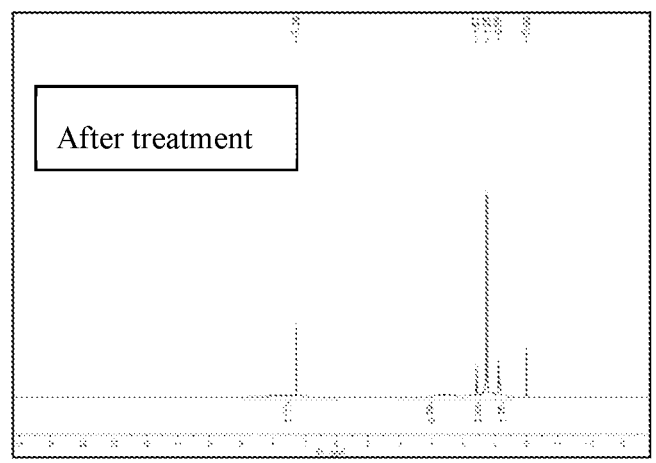
FIG. 1B shows an $^1$H-NMR spectrum of the crude oil-contaminated soil after treatment.

Through the four-component composition analysis of petroleum hydrocarbons in the soil before and after pyrolysis, it was found that, after the pyrolysis, the contents of colloid and asphaltene among petroleum hydrocarbons in the soil were greatly reduced, indicating an excellent removal effect. It can be seen from the $^1$HNMR spectra in FIGS. 1A-B and the $^1$HNMR data in Table 2 that, after the pyrolysis, hydrogen atoms at the α, β, and γ positions in the residual oil were significantly reduced, indicating an excellent removal effect.

TABLE 2

¹HNMR spectral data of the contaminated soil before and after treatment

| Category | Different chemical shift values (ppm) (fraction)/% | | | |
|---|---|---|---|---|
| | HA 6.0-9.0 | Hα 2.0-4.0 | Hβ 1.0-2.0 | Hγ 0.5-1.0 |
| Before treatment | 1.00 | 1.87 | 18.32 | 6.98 |
| After treatment | 1.00 | 0.79 | 3.33 | 1.15 |

TABLE 3

Contents of four components in the contaminated soil before and after treatment

| Category | Saturates | Aromatics | Colloid | Asphaltene |
|---|---|---|---|---|
| Before treatment/wt % | 51.49 | 24.19 | 20.20 | 0.73 |
| After treatment/wt % | 63.71 | 30.51 | 5.57 | 0.21 |

Example 3

A ground petroleum-contaminated soil sample came from the Karamay Oil Field. The petroleum-contaminated soil had general mobility, a dark-brown color, a higher density than water, and a smell of petroleum, and included sands and agglomerates. As determined, the petroleum-contaminated soil had a water content of 0.98% and a petroleum content of 4.20%.

Remediation was specifically conducted by the following steps:

(1) Impurity removal pretreatment: large pieces of the petroleum-contaminated soil were crushed in a crusher and then sieved through a 40-mesh sample sieve to remove impurities from the petroleum-contaminated soil to obtain a petroleum-contaminated soil sample.

(2) Photocatalytic pre-oxidation: 10.00 g of the petroleum-contaminated soil sample was weighed and then thoroughly mixed with 0.05 g of catalyst C-2 and 0.01 g of hydrogen peroxide with a mass concentration of 30%, and a resulting mixture was spread under sunlight and insolated for 7 h, during which period, the mixture was turned over from time to time.

(3) Stepwise pyrolysis: a sample obtained from the photocatalytic pre-oxidation was added to a test tube and then placed in a reactor, and a pyrolysis process was conducted based on stepwise temperature rise, where, the pyrolysis process included 3 stages: a first stage: temperature: 300° C. to 350° C., and heating time: 30 min to 60 min; a second stage: temperature: 400° C. to 450° C., and heating time: 60 min to 120 min; and a third stage: temperature: 500° C. to 550° C., and heating time: 60 min to 120 min.

(4) A material obtained from the stepwise pyrolysis was cooled to obtain remedied soil.

The pyrolyzed soil was subjected to extraction with DCM, then the solvent was evaporated by suction filtration, and a calculated petroleum content in the remedied soil was 0.03%, with an actual removal rate of 99.28%. In the remedied soil, the contents of colloid and asphaltene among petroleum hydrocarbons were greatly reduced, indicating an excellent removal effect.

Example 4

A ground petroleum-contaminated soil sample came from the Changqing Oil Field. The petroleum-contaminated soil had general mobility, a dark color, a higher density than water, and a smell of petroleum, and included sands. As determined, the petroleum-contaminated soil had a water content of 0.39% and a petroleum content of 10.41%.

Remediation was specifically conducted by the following steps:

(1) Impurity removal pretreatment: large pieces of the petroleum-contaminated soil were crushed in a crusher and then sieved through a 40-mesh sample sieve to remove impurities from the petroleum-contaminated soil to obtain a petroleum-contaminated soil sample.

(2) Photocatalytic pre-oxidation: 10.00 g of the petroleum-contaminated soil sample was weighed and then thoroughly mixed with 0.05 g of catalyst C-3 and 0.01 g of hydrogen peroxide with a mass concentration of 30%, and a resulting mixture was spread under sunlight and insolated for 15 h, during which period, the mixture was turned over from time to time.

(3) Stepwise pyrolysis: a sample obtained from the photocatalytic pre-oxidation was added to a test tube and then placed in a reactor, and a pyrolysis process was conducted based on stepwise temperature rise, where, the pyrolysis process included 3 stages: a first stage: temperature: 300° C. to 350° C., and heating time: 30 min to 60 min; a second stage: temperature: 400° C. to 450° C., and heating time: 60 min to 120 min; and a third stage: temperature: 500° C. to 550° C., and heating time: 60 min to 120 min.

(4) A material obtained from the stepwise pyrolysis was cooled to obtain remedied soil.

The pyrolyzed soil was subjected to extraction with DCM, then the solvent was evaporated by suction filtration, and a calculated petroleum content in the pyrolyzed soil was 0.16%, with an actual removal rate up to 98.46%. In the remedied soil, the contents of colloid and asphaltene among petroleum hydrocarbons were greatly reduced, indicating an excellent removal effect.

What is claimed is:

1. A combined remediation method of a petroleum-contaminated soil, comprising the following specific steps:
   (1) an impurity removal pretreatment: crushing and removing impurities to obtain a petroleum-contaminated soil sample;
   (2) a photocatalytic pre-oxidation: taking a predetermined amount of the petroleum-contaminated soil sample, adding a catalyst with a mass concentration of 0.5% a mass of the petroleum-contaminated soil sample and a 30 wt % hydrogen peroxide with a mass concentration of 0.1% the mass of the petroleum-contaminated soil sample to obtain a resulting mixture, and thoroughly mixing the resulting mixture; and spreading the resulting mixture under sunlight and insolating the resulting mixture for 6 h to 15 h, during a period of insolating, the resulting mixture is turned over from time to time to obtain a first treated material;
   wherein, the catalyst is an iron-titanium composite metal oxide (ITCMO);
   (3) a stepwise pyrolysis: transferring the first treated material obtained in step (2) to an equipment chamber for the stepwise pyrolysis to obtain a second treated material, wherein, a pyrolysis process comprises 3 stages: a first stage: a first temperature: 300° C. to 350° C., and a first heating time: 30 min to 60 min; a second stage: a second temperature: 400° C. to 450° C., and a second heating time: 60 min to 120 min; and a third stage: a third temperature: 500° C. to 550° C., and a third heating time: 60 min to 120 min; and (4) cooling the second treated material obtained from the stepwise pyrolysis to obtain a remedied soil.

2. The combined remediation method of the petroleum-contaminated soil according to claim 1, wherein the ITCMO is $Fe_xTiO_y$; and the x has a range of 0.008 to 0.76 and the y has a range of 2.012 to 3.14.

3. The combined remediation method according to claim 2, wherein the remedied soil has a petroleum content of less than 0.20%, exhibiting a removal rate of more than 98.00%.

4. The combined remediation method of the petroleum-contaminated soil according to claim 2, wherein the $Fe_xTiO_y$ is prepared by the following method:

adding a 30 wt % iron precursor solution dropwise to 250 mL of deionized water under a stirring to obtain a first mixture, and further stirring the first mixture for 10 min; adding a solution of 85 wt % titanium precursor in isopropanol into the first mixture dropwise to obtain a second mixture, and further stirring the second mixture for 30 min; adding ammonia water into the second mixture dropwise to obtain a third mixture, adjusting a pH of the third mixture to 8.6 to 9.0, and stirring the third mixture for 2 h; statically aging the third mixture for 12 h at 60° C., filtering, and washing the third mixture with deionized water to neutrality to obtain a resulting product; and roasting the resulting product at 350° C. for 6 h to obtain the catalyst $Fe_xTiO_y$.

5. The combined remediation method of the petroleum-contaminated soil according to claim 4, wherein Fe and Ti in the catalyst have a molar ratio of 0.01 to 0.5.

6. The combined remediation method according to claim 5, wherein the remedied soil has a petroleum content of less than 0.20%, exhibiting a removal rate of more than 98.00%.

7. The combined remediation method according to claim 4, wherein the remedied soil has a petroleum content of less than 0.20%, exhibiting a removal rate of more than 98.00%.

8. The combined remediation method of the petroleum-contaminated soil according to claim 4, wherein the 30 wt % iron precursor solution is a soluble iron salt aqueous solution and a soluble iron salt of the soluble iron salt aqueous solution is at least one selected from the group consisting of ferric chloride, ferric nitrate, and iron acetate; and the solution of 85 wt % titanium precursor in isopropanol is a solution of soluble titanate in isopropanol, and the soluble titanate is titanium tetraisopropoxide (TTIP) or tetrabutyl titanate (TBT).

9. The combined remediation method according to claim 8, wherein the remedied soil has a petroleum content of less than 0.20%, exhibiting a removal rate of more than 98.00%.

10. The combined remediation method of the petroleum-contaminated soil according to claim 1, wherein the impurity removal pretreatment comprises: crushing large pieces of the petroleum-contaminated soil in a crusher until an obtained material has a size of less than 40 mesh, and sieving the obtained material through a 40-mesh sample sieve to remove the impurities from the petroleum-contaminated soil.

11. The combined remediation method according to claim 10, wherein the remedied soil has a petroleum content of less than 0.20%, exhibiting a removal rate of more than 98.00%.

12. The combined remediation method of the petroleum-contaminated soil according to claim 1, wherein the remedied soil has a petroleum content of less than 0.20%, exhibiting a removal rate of more than 98.00%.

13. A method for a remediation of the petroleum-contaminated soil, comprising using the combined remediation method according to claim 1 in the remediation of the petroleum-contaminated soil.

14. The method according to claim 13, wherein the ITCMO is $Fe_xTiO_y$; and the x has a range of 0.008 to 0.76 and the y has a range of 2.012 to 3.14.

15. The method according to claim 14, wherein the $Fe_xTiO_y$ is prepared by the following method:

adding a 30 wt % iron precursor solution dropwise to 250 mL of deionized water under a stirring to obtain a first mixture, and further stirring the first mixture for 10 min; adding a solution of 85 wt % titanium precursor in isopropanol into the first mixture dropwise to obtain a second mixture, and further stirring the second mixture for 30 min; adding ammonia water into the second mixture dropwise to obtain a third mixture, adjusting a pH of the third mixture to 8.6 to 9.0, and stirring the third mixture for 2 h; statically aging the third mixture for 12 h at 60° C., filtering, and washing the third mixture with deionized water to neutrality to obtain a resulting product; and roasting the resulting product at 350° C. for 6 h to obtain the catalyst $Fe_xTiO_y$.

16. The method according to claim 15, wherein the 30 wt % iron precursor solution is a soluble iron salt aqueous solution and a soluble iron salt of the soluble iron salt aqueous solution is at least one selected from the group consisting of ferric chloride, ferric nitrate, and iron acetate; and the solution of 85 wt % titanium precursor in isopropanol is a solution of soluble titanate in isopropanol, and the soluble titanate is titanium tetraisopropoxide (TTIP) or tetrabutyl titanate (TBT).

17. The method according to claim 15, wherein Fe and Ti in the catalyst have a molar ratio of 0.01 to 0.5.

18. The method according to claim 13, wherein the impurity removal pretreatment comprises: crushing large pieces of the petroleum-contaminated soil in a crusher until an obtained material has a size of less than 40 mesh, and sieving the obtained material through a 40-mesh sample sieve to remove the impurities from the petroleum-contaminated soil.

19. The method according to claim 13, wherein the remedied soil has a petroleum content of less than 0.20%, exhibiting a removal rate of more than 98.00%.

* * * * *